A. D. LIGHTNER AND E. HOLMES.
HOISTING APPARATUS.
APPLICATION FILED DEC. 7, 1917.
1,398,331.
Patented Nov. 29, 1921.
3 SHEETS—SHEET 1.
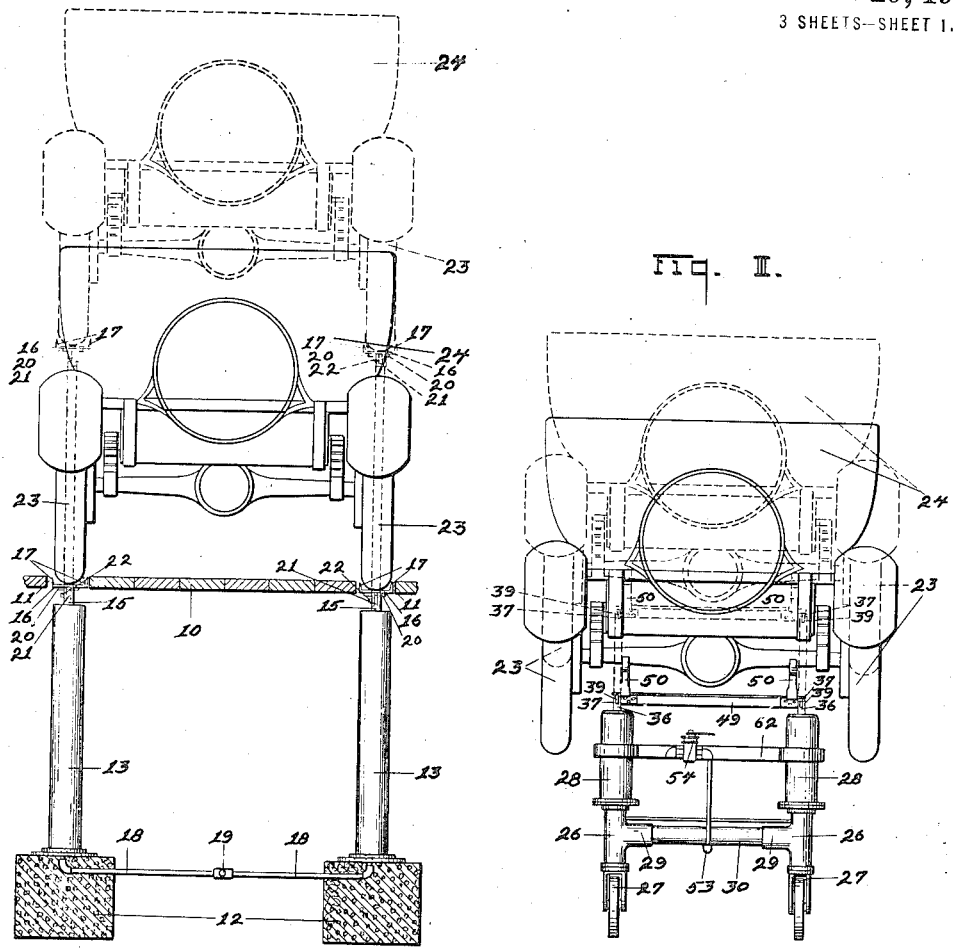
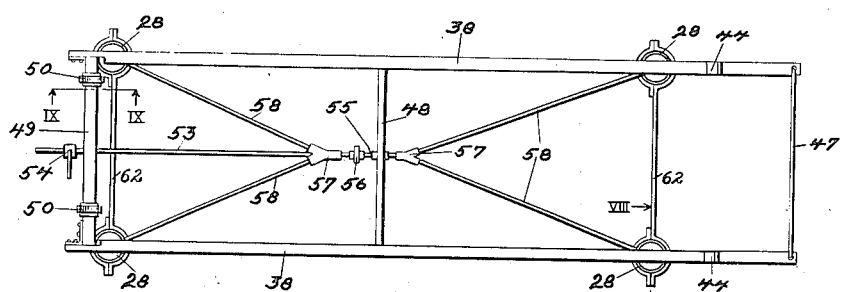
Inventors
Arthur D. Lightner
Edward Holmes
By Chester H Braselton
Attorney

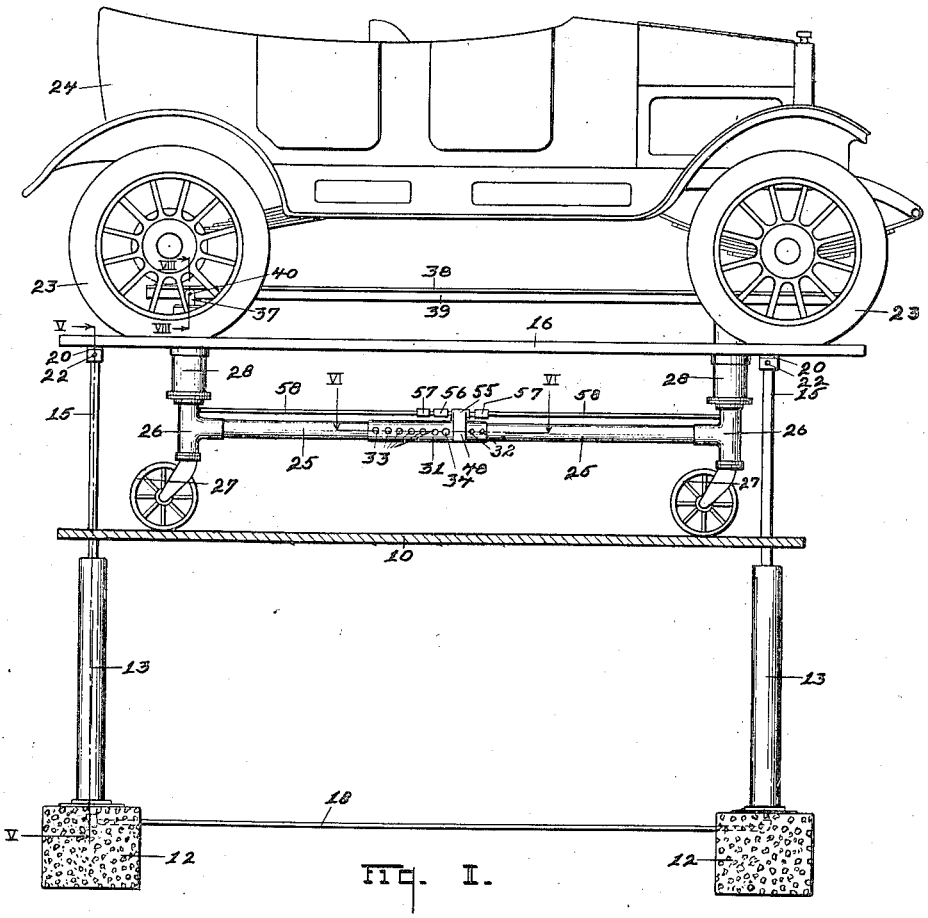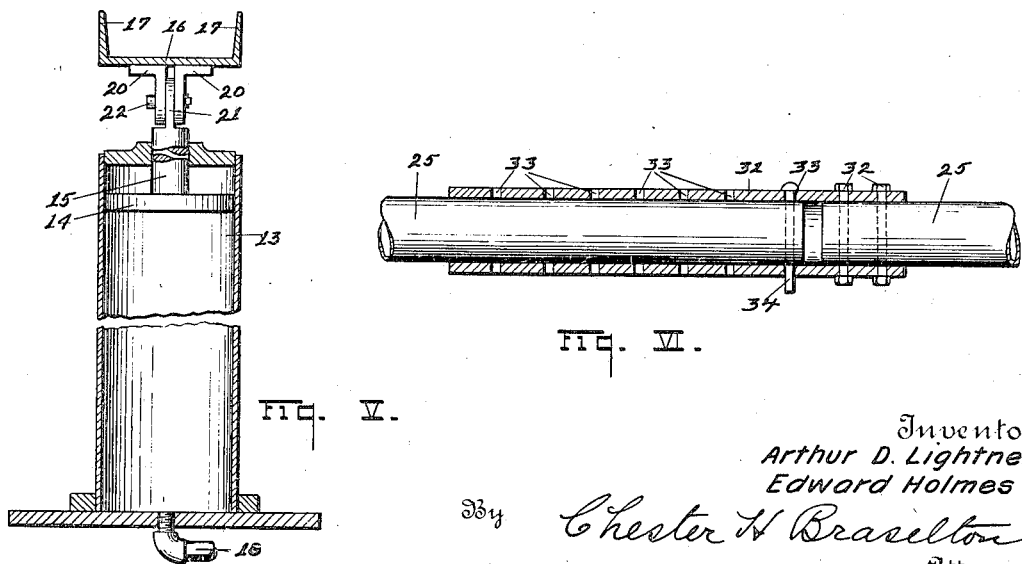

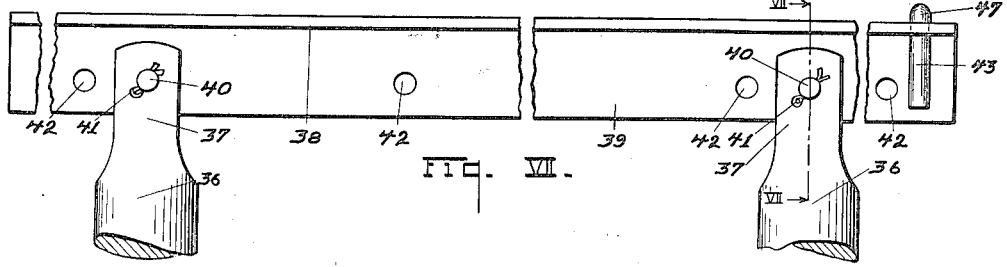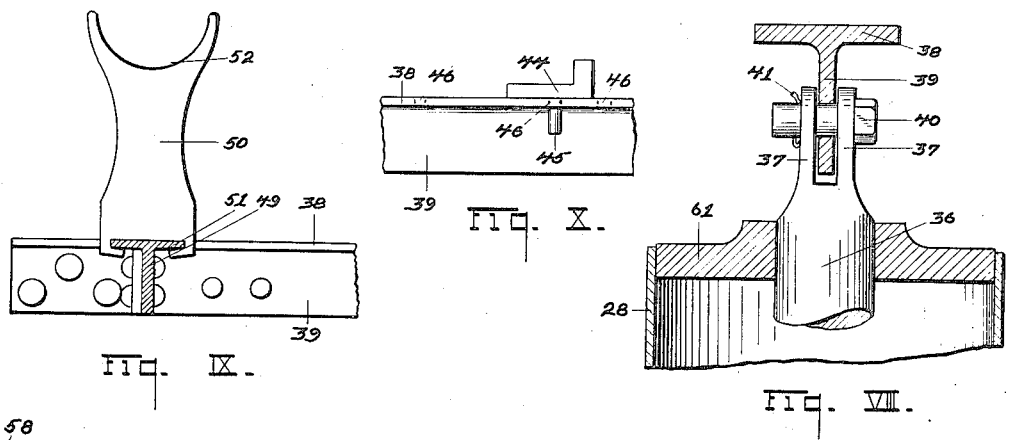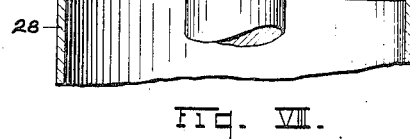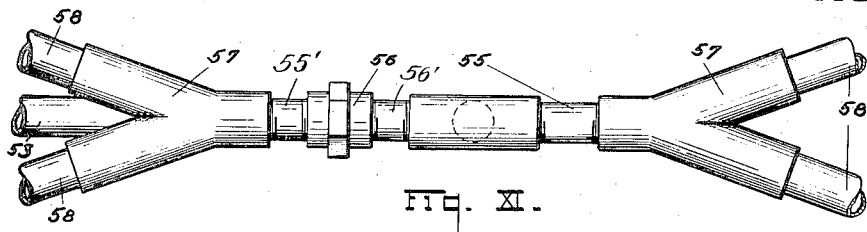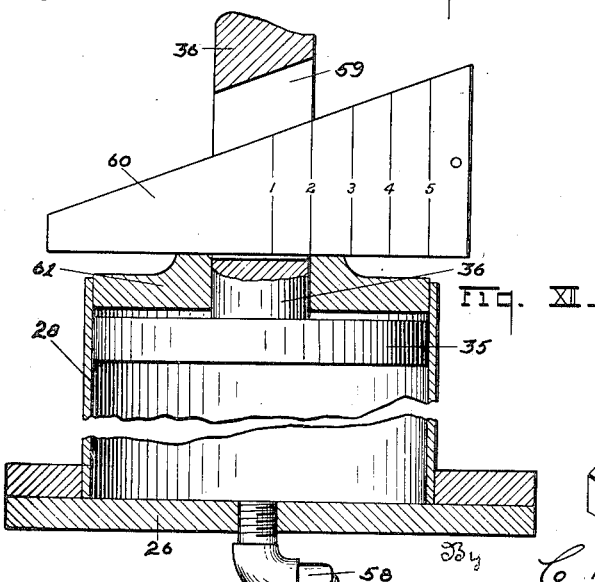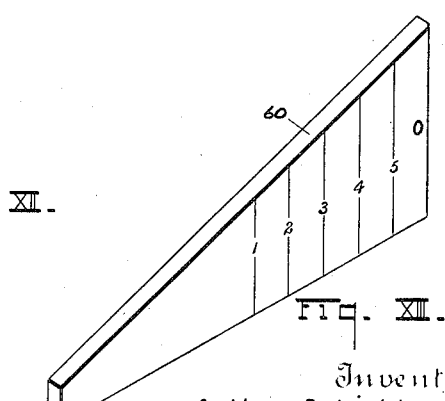

UNITED STATES PATENT OFFICE.

ARTHUR D. LIGHTNER AND EDWARD HOLMES, OF TOLEDO, OHIO, ASSIGNORS TO THE WILLYS-OVERLAND COMPANY, OF TOLEDO, OHIO, A CORPORATION OF OHIO.

HOISTING APPARATUS.

1,398,331.　　　　　Specification of Letters Patent.　　Patented Nov. 29, 1921.

Application filed December 7, 1917. Serial No. 205,996.

*To all whom it may concern:*

Be it known that we, ARTHUR D. LIGHTNER and EDWARD HOLMES, citizens of the United States, residing at Toledo, in the county of Lucas and State of Ohio, have invented certain new and useful Improvements in Hoisting Apparatus, of which we declare the following to be a full, clear, and exact description.

This invention relates to improvements in hoisting apparatus and more particularly, hoisting apparatus for use in connection with loading and double-decking of automobiles in freight cars.

The principal object of this invention is to provide improved hoisting apparatus which will very greatly facilitate and shorten the time necessary for loading automobiles in freight cars, particularly in cases where the automobile is hoisted to the upper part of the car and supported therein for the purpose of loading a second motor beneath it. This method of loading being known as double-decking.

In double-decking automobiles in freight cars, it is customary to push the motor vehicle by main force into the freight car, and this necessarily involves the turning of sharp corners, which is a difficult thing to accomplish under the circumstances and in view of the fact that the laborers used in this loading are unskilled and are likely to injure or damage the motor vehicle in loading the same. Furthermore, where the automobile is double-decked by supporting the ends of the axles on tripods at the sides of the freight cars, so that another automobile can be loaded beneath the first, it is customary to attach chain-falls to the roof of the car and hoist the automobile into place by means of these chain falls, holding the automobile suspended while the tripods are built and secured in place beneath it.

One object of this invention is to provide improved means for getting the automobile from the loading dock into the freight car, involving great economy in labor.

A further object of this invention is to provide means for hoisting the automobile into position so that the double-decking tripods can be secured in place beneath the axle.

Further objects, and objects relating to economies of manufacture and details of construction, will definitely appear from the detailed description to follow.

We accomplish the objects of our invention by the devices and means described in the following specification. Our invention is clearly defined and pointed out in the appended claims.

A structure constituting a preferred embodiment of our invention is illustrated in the accompanying drawings, forming a part of this specification, in which—

Figure I is a transverse, sectional view through a loading dock embodying our invention, showing an automobile in rear elevation thereon, the elevated position of the automobile being indicated in dotted lines.

Fig. II is a longitudinal, sectional view through the loading dock, showing the hoisting apparatus embodied therein, and showing a hoisting truck on the loading platform beneath an automobile hoisted thereon.

Fig. III is a rear elevational view of an automobile in place on a hoisting truck embodying our invention, the automobile being shown in hoisted position by dotted lines.

Fig. IV is a top plan view of a hoisting truck.

Fig. V is a fragmentary, detail, sectional view, taken substantially on the line V—V of Fig. II.

Fig. VI is a detail, sectional view, taken substantially on the line VI—VI of Fig. II.

Fig. VII is a detail, fragmentary view in side elevation, showing the upper frame of the hoisting truck.

Fig. VIII is a detail, sectional view, taken substantially on the line VIII—VIII of Figs. IV and VII.

Fig. IX is a detail, sectional view, taken substantially on the line IX—IX of Fig. IV.

Fig. X is a fragmentary view in side elevation of the forward end of the side bar of the upper frame showing the stop for the front axle mounted thereon.

Fig. XI is a top plan view of the central part of IV, showing the connections from the air pipe to the various lifting cylinders.

Fig. XII is a detail, sectional view, corresponding to the lower part of Fig. VIII, but showing the plunger in elevated position with a holding wedge inserted therein, and Fig. XIII is a perspective view of the holding wedge.

In the drawings, similar reference numerals refer to similar parts throughout the several views, and the sectional views are taken looking in the direction of the little arrows at the ends of the section lines.

In carrying out our invention, we provide a loading dock or platform having a pair of parallel rails therein, which are substantially as far apart as the usual tread of an automobile. These rails are supported by lifting jacks located beneath the platform, so that they may be lifted to elevate an automobile, which has been run thereon, into the air a substantial distance above the loading platform. The automobile being so elevated, a hoisting truck may be run beneath it and then the rails are lowered so as to allow the automobile to rest on the truck. The automobile resting on the truck can then be run into the freight car in which it is to be loaded, and the automobile can be still further hoisted by means of the lifting jacks mounted on the truck, so that it may be lifted and held in elevated position to facilitate the building of the tripods beneath the axles for supporting the automobile in elevated position in the car in order to allow the loading of another automobile beneath the first one.

Considering the numbered parts of the drawing, we have shown a platform 10 provided with a pair of parallel slots 11 therein. On the foundation 12, beneath the platform, are mounted the hydraulic cylinders 13, in each of which a piston 14, works, being provided with a plunger 15, the upper end of which projects through the top of the cylinder 13, as shown in Fig. V of the drawing. A rail 16 is normally disposed in each of the slots 11, said rails being provided with the side flanges 17. The angle brackets 20 are secured to the lower surfaces of the rails 16, and the plungers 15 have upwardly extending ears 21, which are disposed between the brackets 20 and secured thereto by means of the pins 22. The cylinders 13 may be connected by the pipe 18 with any suitable source of fluid pressure through the connection 19. A central controlling means is preferably provided in the connection 19 by means of which the fluid pressure to the cylinders may be controlled in a manner which is well understood in the art so as to admit pressure equally and simultaneously to all the cylinders.

A hoisting truck is provided, which is made up of the side members 25 at one end of each of which is connected a T-coupling 26, to which are secured the caster wheels 27, and upon which are mounted the hydraulic cylinders 28. The laterally extending arms 29 project from the sides of the couplings 26, and are connected together by the cross bars 30. One end of each of the side members 25 projects into a sleeve 31, each of said sleeves being secured to one of the side members 25 by the bolt 32, and, to the other side member, by means of a pin 34 projecting through any one of a plurality of holes 33 in the sleeve 31. Both the side members of the lower frame are formed in this manner, so that this frame is adjustable lengthwise and carries on its corners the caster wheels 27 and the hydraulic cylinders 28. A piston 35 is mounted in each of the cylinders 28 and has a plunger 36, which extends upwardly therefrom and has the parallel ears 37 on the upper end thereof.

The upper frame is formed of the T-shaped side bars 38, which are connected together at their ends by the cross members 47 and 49. These T-shaped side members 38 have a downwardly extending flange 39, which is disposed between the ears 37 at the top of the plungers 36 and connected thereto by means of the transverse pins 40, held in place by the cotter pins 41. A plurality of openings 42 are provided through the flanges 39 of the side members 38, so that the plungers 36 may be connected to said side members 38 at a number of different points. The ends of the cross member 47 are turned downwardly at 43 and extend through the head of the T-shaped bar 38. The head of the side member 38 is provided with a plurality of openings 46, through which the stem 45 of the angle bracket 44 may extend. This angle bracket acts as a stop against which the front axle of the motor vehicle may rest when it is mounted in place upon the upper frame of the hoisting truck.

The cross member 49 connects the rear ends of the side members 38 together, said cross member being T-shaped in cross section. A pair of yoke members 50 are provided with undercut slots 51 at their lower ends, in which the T-shaped cross member 49 is disposed so that the yokes 50 are slidably mounted thereon. The upper end of each yoke has a concave seat 52, as shown in Fig. IX, so as to receive the rear axle of a motor vehicle and support the same against movement longitudinally of the frame.

A pipe 55 is supported by the cross member 48 extending between the sleeves 31 connecting the parts 25 of the side members of the lower frame, and this pipe 55 is connected with a pipe 53, having a stop cock 54 therein, by which compressed air or other fluid pressure may be admitted to the various hydraulic cylinders 28 of the truck. Pipe 55 is connected through the coupling 56 and the Y-couplings 57 to the branches 58, which lead to the various cylinders 28. The entrance of fluid pressure to these cylinders may be controlled at the point 54, so that pressure is transmitted to all of the cylinders equally and simultaneously.

The pipe 55 comprises a plurality of lengths including sections 55' and 56' which may be replaced by sections of different lengths when it is desired to change the length of the truck frame to accommodate the same to automobiles of different lengths for suitably distributing the weight of the automobile upon the truck frame. It will be understood that so long as the truck is used for transporting automobiles of one type the length of the truck will remain unchanged and the necessity for changing the length arises only when changing from one type of automobile to another. Thus the necessity for changing the length of the truck arises only at considerable intervals whereby a more rapid means of effecting this adjustment is rendered unnecessary.

In the lower part of each plunger 36 is provided a transverse slot 59 provided with an inclined upper edge, and a wedge 60 is provided, which is adapted to be inserted through said slot 59, having its base resting on the top 61 of the plunger cylinder 38, so that, when the pressure is released in these cylinders 28, the plungers 37 may descend until the upper edge 59 of the slot rests on the top of the wedge 60, so that the wedge serves to maintain the plunger in its elevated position. The wedge 60 may be graduated so as to indicate different heights at which the upper frame will be supported by this plunger when the wedges are in place, this graduation being provided for convenience in inserting the wedges. A brace member 62 extends between each pair of cylinders 28 and the rear brace supports the stop cock 54 for controlling the flow of fluid pressure through the pipe 53 to the connections which lead to the various cylinders.

From the description of the parts given above, the operation of this apparatus should be very readily understood. The normal position of the hoisting apparatus in connection with the loading dock is shown in full lines in Fig. I, in which the rails 16, which are spaced as far apart as the wheels of an automobile, are disposed in the slots 11, in the plane of the loading platform 10. An automobile 24 is driven upon the loading platform until its wheels 23 rest on the rails 16. Compressed air is then admitted through the pipes 19 and 18, to the cylinders 13, so that the pistons 14 in said cylinders are lifted, lifting the plungers 15 and the rails 16 until the automobile is supported in elevated position as shown in dotted lines in Fig. I. Any suitable means may be provided for controlling the flow of compressed air through the pipes 18, said control being preferably central, so as to control the flow of compressed air into all of the cylinders simultaneously.

When the automobile is in an elevated position, as shown in Fig. I of the drawing, a hoisting truck is pushed in place beneath the automobile, as shown in Fig. II.

When the truck is pushed in place beneath the elevated automobile, the stops 44 and the yokes 50 being properly set with reference to the particular type of automobile which is to be loaded, the air pressure in the plungers 13 is released, so as to allow the motor vehicle to descend until the rear axle rests on the yokes 50 and the front axle engages the side members 38 and abuts the stops 44. The automobile is now entirely supported upon the hoisting truck and the pressure in the cylinders 13 is released so as to lower the rails 16 to the normal position. The automobile is now carried into the freight car on the hoisting truck, and, if it is desired to double-deck the automobile in the freight car, that is to say, to support the automobile in an elevated position in the freight car, so as to load another automobile beneath, the air pressure is applied to the cylinders 28, through the pipes 53 and 58, controlled by the stop cock 54, so that the upper frame on which the automobile is supported is lifted bodily, as shown in dotted lines in Fig. III. When this upper frame has been lifted to the desired position, the wedges 60 may be inserted through the slots 59 in the plungers 36, so that these wedges will automatically support the plungers and frame in elevated position while the tripods are being constructed and secured in place, to permanently support the automobile in position in the freight car. When these tripods are finished, the wedges may be removed and the pressure released so that the automobile will descend into its supports on the tripods, and be firmly secured in place. The truck can then be removed from the freight car and used for loading another machine.

We are aware that the particular embodiment of our invention, which we have here shown and described, is susceptible of considerable variation without departing from the spirit of our invention, and, therefore, we desire to claim the same broadly, as well as specifically, as indicated by the appended claims.

Having thus described our invention, what we claim as new and desire to secure by Letters Patent, is:

1. A hoisting apparatus comprising the combination of a frame, adjustable in length and mounted on suitable supporting wheels; a plurality of lifting jacks carried by said frame; an upper frame carried by said lifting jacks and provided with transversely adjustable members and longitudinally adjustable means to receive and support a motor vehicle; and means for simultaneously and equally operating said jacks to lift said motor vehicle.

2. A hoisting apparatus comprising the combination of a frame, adjustable in length and mounted on suitable supporting wheels; a plurality of lifting jacks carried by said frame; an upper frame carried by said lifting jacks, and comprising side members and front and rear cross members; a pair of yokes slidably mounted on said rear cross member and adapted to receive the axle of a motor vehicle; stops adjustably mounted on the side members and means for simultaneously and equally operating said jacks to lift said motor vehicle.

3. A hoisting apparatus comprising the combination of a frame, adjustable in length and mounted on suitable supporting wheels; a plurality of simultaneously operable lifting jacks carried by said frame; an upper frame carried by said lifting jacks and including side members and front and rear cross members; yokes mounted on said rear cross member and adapted to engage the rear axle of a motor vehicle; stops adjustably mounted on said side members and adapted to engage the front axle of a motor vehicle; and means for simultaneously and equally actuating said jacks to lift said motor vehicle.

4. A hoisting apparatus comprising the combination of a frame, adjustable in length and mounted on suitable supporting wheels; a plurality of lifting jacks carried by said frame; an upper frame, provided with means for supporting a motor vehicle thereon, adjustably connected to and carried by said jacks; and means for simultaneously and equally operating said jacks to lift said motor vehicle.

5. A hoisting apparatus comprising the combination of a frame, adjustable in length and mounted on suitable supporting wheels; a plurality of fluid pressure jacks mounted on said frame and each including a cylinder and a plunger mounted therein; an upper frame comprising side members, each having a depending flange, and cross members connecting said side members together, the flanges of said side members being detachably connected to the upper ends of said plungers; means for supporting a motor vehicle on said upper frame; and means for simultaneously and equally admitting fluid pressure to the cylinders of said jacks.

6. A hoisting apparatus comprising the combination of a lower frame, adjustable in length and mounted on suitable supporting wheels; cylinders mounted on the corners of said frame; connections between said cylinders and a source of fluid pressure, said connections being adjustable in length with said frame; a plunger mounted in each of said cylinders; an upper frame mounted on the upper ends of said plungers; means for supporting a motor vehicle on said upper frame; and means for admitting fluid pressure to said cylinders simultaneously and equally.

7. A hoisting apparatus comprising the combination of a lower frame mounted on suitable supporting wheels; a plurality of cylinders mounted on said frame; means for admitting fluid pressure to said cylinders simultaneously and equally; plungers working in said cylinders, each of said plungers being provided with a slot extending transversely therethrough; a frame carried by the upper ends of said plungers; means for supporting a motor vehicle on said upper frame; and wedges insertible through the slots in said plungers.

8. In a device of the class described, a lower frame, a plurality of cylinders carried by said frame, plungers carried by said cylinders, means for raising the plungers by admitting fluid pressure to the cylinders, a frame carried by the plungers and movable therewith, and means independent of the fluid pressure for maintaining the plungers in elevated position.

9. In a device of the class described, a lower frame, a plurality of cylinders carried by said frame, plungers carried by said cylinders, means for raising the plungers by admitting pressure to the cylinders, a frame carried by the plungers and movable therewith, and means for retaining the plungers in raised position when the pressure in the cylinders has been reduced.

10. In a hoisting apparatus, a lower frame comprising adjustable side members for permitting adjustment of the side frame members to suitably distribute the weight upon the lower frame, a plurality of cylinders carried by the lower frame, plungers mounted in the cylinders, an upper frame carried by the plungers, and adjustable supports carried by the upper frame for accommodating the same to vehicles of different type.

In testimony whereof we affix our signatures.

ARTHUR D. LIGHTNER.
EDWARD HOLMES.